Dec. 1, 1931.    J. P. TARBOX ET AL    1,834,507
SCREW TYPE SPOKE AND RIM ATTACHMENT
Filed Feb. 14, 1930
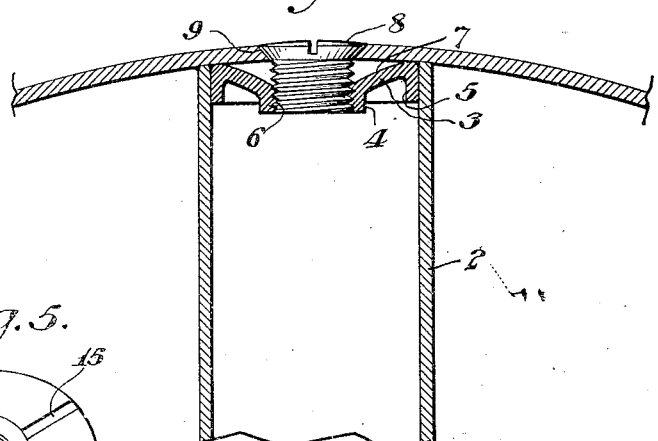
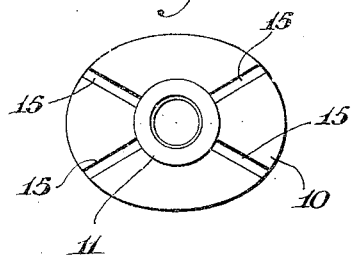
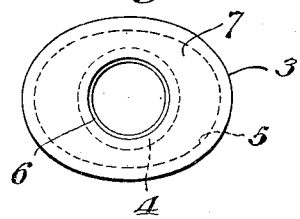
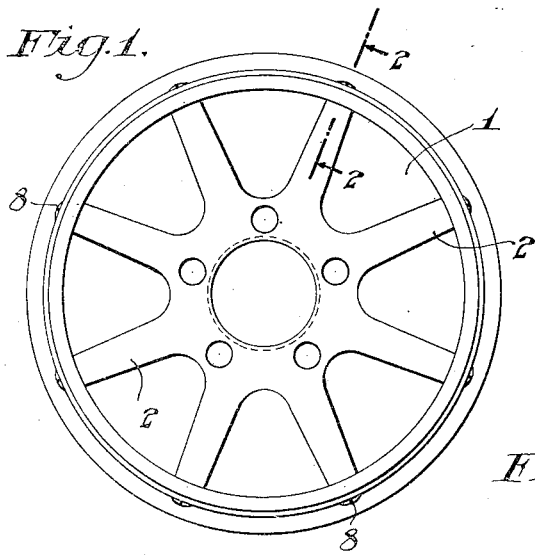
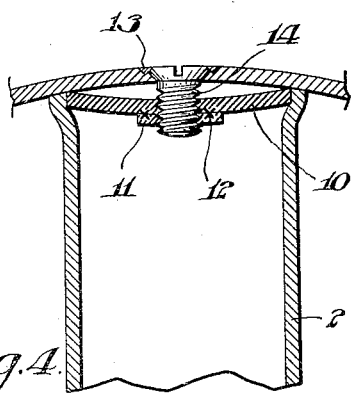
INVENTORS
John P. Tarbox,
and Carolus L. Eksergian
BY
ATTORNEY.

Patented Dec. 1, 1931　　　　　　　　　　　　　　　　　1,834,507

UNITED STATES PATENT OFFICE

JOHN P. TARBOX, OF PHILADELPHIA, PENNSYLVANIA, AND CAROLUS L. EKSERGIAN, OF DETROIT, MICHIGAN, ASSIGNORS TO BUDD WHEEL COMPANY, OF PHILADELPHIA, PENNSYLVANIA, A CORPORATION OF PENNSYLVANIA

SCREW TYPE SPOKE AND RIM ATTACHMENT

Application filed February 14, 1930. Serial No. 428,321.

Our invention relates to an end fastening between a hollow metal spoke and a rim or felly of a vehicle. It has been our purpose to produce an end fastening of this kind which will securely hold the parts in their assembled relation and will be cheap to manufacture and have a pleasing appearance.

We have achieved this result by placing a resilient end cap within the end of the spoke and connecting it to a screw which extends through the rim or felly. In this way the periphery of the resilient cap is forced outwardly until it presses tightly against the inner side of the end of the spoke. The three parts are thus held together intimately by the screw.

In the drawings,

Fig. 1 shows the wheel of our invention.

Fig. 2 shows a section on the line 2—2 of Fig. 1.

Fig. 3 is a plan view of the end cap detached from its associated parts.

Fig. 4 is a view similar to Fig. 2 showing a modification, and

Fig. 5 is a plan view of the cap used in the modification of Fig. 4.

Referring more specifically to the drawings, the reference character 1 represents a wheel having hollow spokes 2. These spokes are provided adjacent their outer ends with end caps 3 having downwardly turned flanges 5 adjacent their outer peripheries, and downwardly turned flanges 4 about openings at the center thereof. These flanges 4 are provided with internal screw threads 6. The upper side 7 of the cap 4 is of concave shape and the cap is formed of pressed metal whereby to give it a certain resilience. A screw 8 is provided with threads meshing with threads 6 and seats in a conical opening 9 in the rim or felly. When this screw is tightened the central portion of the cap 3 will be pulled upwardly, thereby tending to flatten the concave upper surface of the cap and expand the edge flange 5 of the cap. The edge of the cap when expanded in this way, will press tightly against the outer end of the spoke 2, and we thus obtain a tight connection between these members. The resilience of the cap 3 also serves to lock the screw 8 in its engagement therewith. We have thus produced a spoke and rim connection of a secure nature and superior strength, and this connection has the additional advantages of simplicity and inexpensive construction.

The modification shown in Fig. 4 shows an end cap 10 without flanges. This cap is concave like the cap 3, of Figs. 1 to 3, and it thus obtains the advantages inherent in that structure. In a structure of this kind it is desirable to have a comparatively long screw threaded portion, and it is therefore desirable to attach a washer 11 to the lower side of this cap by welding, as at 12. The cap and washer have a continuous screw threaded portion cut therethrough to receive the screw 14. The screw is locked in its final position by means of a tack weld 13. This tack weld is, of course, applicable to the structure of Figs. 1 to 3, as well as to this modification. The washer 10 may be provided with grooves 15 as indicated in Fig. 5 to give it added resilience, if desired.

We wish it to be understood that our invention is capable of various modifications and that the forms shown are merely illustrative. We do not, therefore, wish to be limited to either of the forms shown.

We claim:

1. In combination, a vehicle wheel including rim and spoke members each spoke having a hollow portion adjacent its outer end, and means for attaching a spoke to the rim member comprising a resilient cap within the end of the spoke substantially conforming to the contour of the hollow portion of the spoke and adapted to be distorted to increase its circumference, and a fastening element having a head adapted to abut the outer surface of the rim member and a shank passing through an opening in said rim member and secured to said resilient cap to hold said cap in a distorted condition, the distortion of the cap effecting pressure of its peripheral portions against the inner peripheral portion of the hollow end of the spoke to form a substantially rigid union of the spoke and rim, whereby torque is transmitted between the spoke and rim members through the cap and fastening element.

2. In combination, a vehicle wheel including rim and spoke members each spoke having a hollow portion adjacent its outer end, and means for attaching a spoke to the rim member comprising a resilient cap within the end of the spoke substantially conforming to the contour of the hollow portion of the spoke and adapted to be distorted to increase its circumference, and a fastening element having a head adapted to abut the outer surface of the rim member and a threaded shank passing through an opening in said rim member and secured to said resilient cap by means of a complementally threaded opening in said cap to hold said cap in a distorted condition, the distortion of the cap effecting pressure of its peripheral portions against the inner peripheral portion of the hollow end of the spoke to form a substantially rigid union of the spoke and rim, whereby torque is transmitted between the spoke and rim members through the cap and fastening element.

In testimony whereof they hereunto affix their signatures.

CAROLUS L. EKSERGIAN.
JOHN P. TARBOX.